July 28, 1964 D. A. MacLEOD 3,142,728

CALL DISTRIBUTING CIRCUIT

Filed June 8, 1962 2 Sheets-Sheet 1

INVENTOR
D. A. MAC LEOD
BY F. A. McCorkendale
ATTORNEY

July 28, 1964 D. A. MacLEOD 3,142,728

CALL DISTRIBUTING CIRCUIT

Filed June 8, 1962 2 Sheets-Sheet 2

INVENTOR
D. A. MAC LEOD
BY
T. A. McCorkendale
ATTORNEY 3,142,728

CALL DISTRIBUTING CIRCUIT

Donald A. MacLeod, Oakland, Calif., assignor to American Telephone and Telegraph Company, New York, N.Y., a corporation of New York Filed June 8, 1962, Ser. No. 201,200
11 Claims. (Cl. 179—27)

Figure 1:
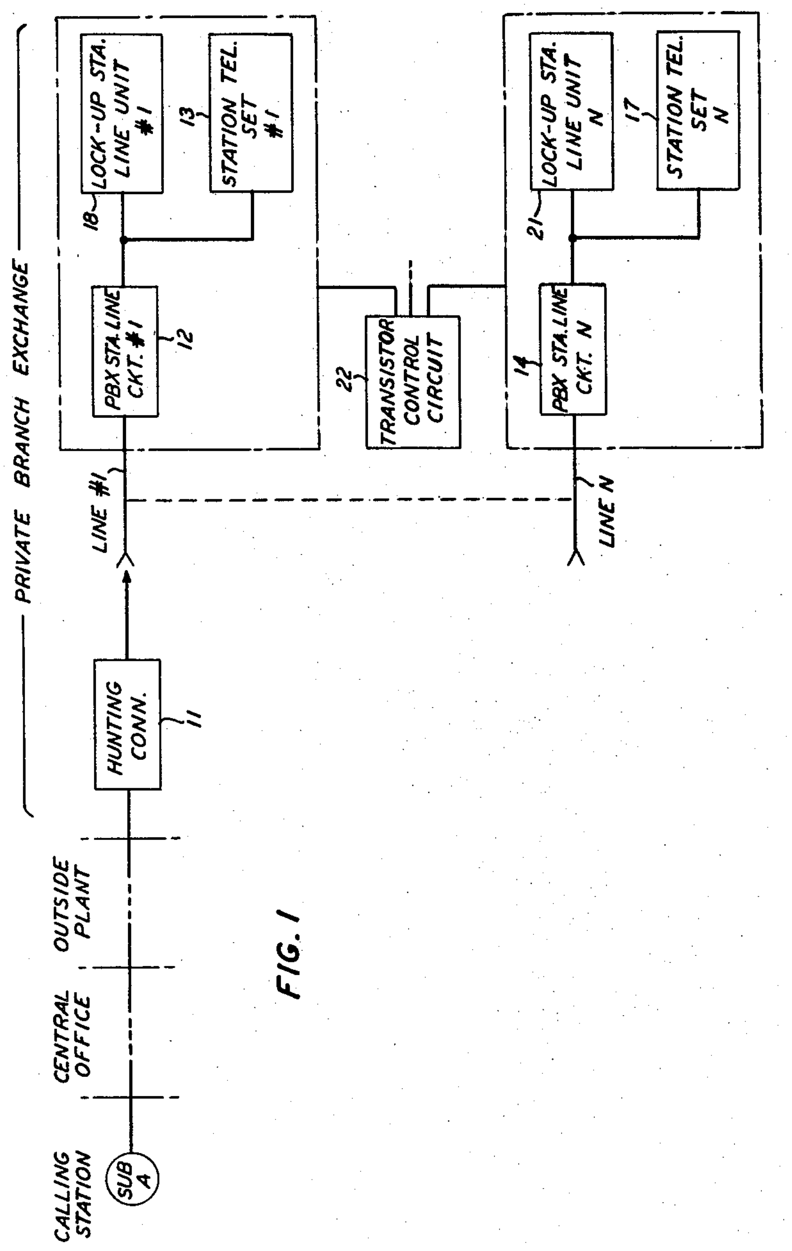

This invention relates to a call distributing circuit and more particularly to a call distributing circuit for use in distributing calls to telephone stations served by a private branch exchange hunting group of lines.

It is common practice, of course, in larger PBX installations, for example those provided for department stores, to serve groups of extension stations by a so-called hunting group of lines. That is, when an outside customer dials a number of the department store and the call reaches the PBX, the hunting connector steps over the terminals of the group of lines assigned to the number until the first nonbusy terminal is found whereupon the call is cut through to the associated station for handling or processing by that particular clerk or attendant. This practice, of course, results in better service to the outside callers, and it is obvious that the number of busy signals and delays encountered by calling subscribers will decrease as the size of the groups provided increases. However, the equitable distribution of incoming calls among all the extension lines or stations often presents a troublesome problem, and this problem tends to increase as the size of the groups becomes larger. Since for each incoming call the hunting connector scans the same terminals until the first free terminal is found, it is obvious that the greater load will be on the lower terminals in the group and the stations connected thereto. Except during periods of heavy load or when the groups are kept relatively small, the higher terminals of the group may be engaged relatively infrequently and the stations associated therewith will have much lighter loads than the other stations. Obviously, this is an undesirable situation economically as well as from the standpoint of employees' morale.

Accordingly, it is an object of my invention to improve the operation of call distributing circuits.

Another object of the invention is the attainment of an equitable distribution of incoming calls among a group of attendants' lines.

A more specific object of the invention is to assure that no station of a group will be called upon to handle a second call until all stations of the group have handled their respective first calls.

Yet another specific object of the invention is to delay the resetting of the circuit, after all extensions have handled a call, until all station line circuits have returned to normal.

According to a specific embodiment of the invention each station of a group is provided with a station line unit which includes a lock-up relay and a capacitor connected in series with the operate winding thereof. While the station is in a nonbusy condition the capacitor is charged by battery supplied through the cut-off relay of the associated PBX station line circuit. When the station is seized, however, ground replaces the CO battery and the capacitor is caused to discharge through the operate winding of the lock-up relay. The lock-up relay operates and locks through a second winding to ground at a transistor circuit which is common to the station group. Operation of the lock-up relay prepares an operate path for a second relay; the second relay operates subsequently, when the station goes on-hook and is released from the connection, and establishes an artificial "busy" on the station line. This progressive artificial busying of the stations continues until each station of the group has completed a call thus assuring that no station will be given a second call until all in the group have handled their first call. The circuit is reset after the last station of the group has been busied.

A feature of the invention is means for progressively applying an artificial busy to each station line in a group as the respective station completes the handling of a call.

A further feature of the invention is means effective after the last line of the group has been busied for initiating the resetting of the circuit.

A still further feature of the invention is means effective during resetting of the circuit to prevent full restoration until all lock-up relays of the group have fully released.

Yet another feature of the invention is means whereby unattended stations may be rendered busy to incoming calls.

A still further feature of the invention is means whereby an artificial busy previously applied to a station line may be removed whereby to permit initiation of an outgoing call from the station.

Another feature of the invention is means effective during initiation of an outgoing call from a station to temporarily interrupt the operating path of the associated lock-up relay whereby to prevent false operation thereof.

Figure 2:
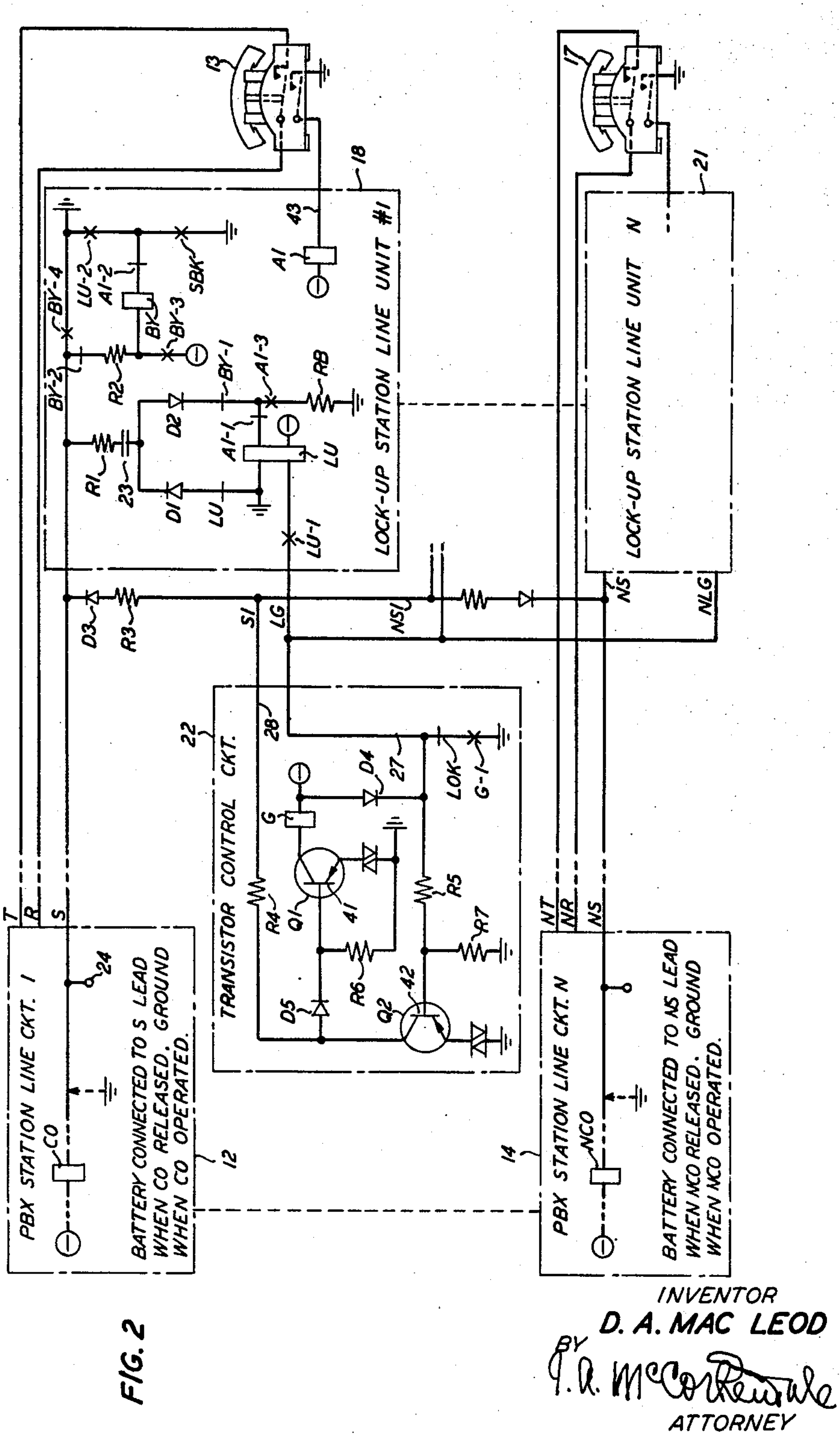

A full understanding of the arrangement contemplated by the present invention as well as an appreciation of the various advantageous features thereof may be gained from consideration of the following detailed description in connection with the accompanying drawing, in which:

FIG. 1 shows schematically the association of one specific illustrative embodiment of the call distributing circuit contemplated by the invention with portions of a telephone system; and FIG. 2 shows the details of one station line unit and the common transistor circuit of the one specific illustrative embodiment referred to and shows schematically the association thereof with the PBX station line circuits.

Referring now to the drawing and first particularly to FIG. 1, it will be assumed that hunting connector 11 at the private branch exchange serves a group of extension lines, the first line No. 1 and the last line N of the group being shown schematically. Line No. 1 is associated through PBX station line circuit 12 with station telephone set 13, while line N is associated through PBX station line circuit 14 with station telephone set 17. Lock-up station line unit 18 is associated with station telephone set 13 while lock-up station line unit 21 is associated with station telephone set 17. Transistor control circuit 22 is common to all lines of the group. It will be understood that the number of lines provided in a group will be varied as local conditions dictate.

A detailed description of the novel circuits included in the call distributing arrangement contemplated by the invention will be given subsequently with particular reference to FIG. 2. However, there will first be given a brief general description of the association of the call distributing arrangement with a typical telephone system, particular reference being made to FIG. 1 in this connection. Assuming, therefore, that subscriber A at the calling station dials the number of the private branch exchange indicated, hunting connector 11, operating in its normal manner, will hunt over the terminals of the group until the first nonbusy terminal is engaged. It will be assumed that this is the terminal of line No. 1. The incoming call is passed to station telephone set 13 by the PBX station line circuit 12 and the call is processed by the attendant or clerk located at station No. 1.

At the time line No. 1 is seized by hunting connector 11, ground is supplied from the connector over the line to lock-up station line unit 18 whereby to cause the discharge of a previously charged capacitor which operates the associated lock-up relay. The operate path of a second relay (busy) is also partially completed at this time. Now when the call is completed and station telephone set No. 1 goes on-hook, battery is supplied over the line from the PBX station line circuit 12 which operates the second relay (busy). Operation of the second relay completes a path for operating the cut-off (CO) relay of the PBX station line circuit 12 which is effective to apply ground to the sleeve lead thereby artificially busying the line to tests by the hunting connector. The term artificial busy is used since through the novel arrangement provided the cut-off (CO) relay of the PBX station line circuit is operated, to busy the line, and held operated even though the line is actually in nonbusy condition.

When the next incoming call is received the hunting connector 11 will, of course, pass over the "busied" terminal of line No. 1 and will seize the first nonbusy terminal contacted. When the call has been processed by the associated telephone set and the set has gone on-hook, that line will also be artificially busied. This artificial busying of the lines will continue until all lines of the group have been so acted upon. It will be apparent, therefore, that an equitable distribution of the work load results since no line of the group can receive a second call until all lines have received and processed their respective first calls.

After the last line of the group has been busied, common transistor control circuit 22 operates to restore all lines to normal for start of the next cycle. However, as will be described in detail subsequently, the novel arrangement of common circuit 22 is such that full restoration of the circuits to normal is prevented until the lock-up relays of all lines have fully released. This is a particularly valuable feature since it assures that a second cycle of the group will not be started with one or more of the stations already artificially busied.

Reference will now be made to FIG. 2 for detailed description of the novel arrangement of the lock-up station line unit and the common transistor control circuit contemplated by the invention. In order to avoid undue enlargement and complication of the disclosure, the PBX station line circuits have not been shown in detail since the arrangement and operation of such circuits, including the completion of the tip and ring line connection to the associated station, are well known in the art. For purposes of our present decription, it has been indicated by legend that, through normal and well understood operations of the cut-off (CO) relay, battery is applied to the sleeve (S) lead when the CO relay is released while ground is applied to the same lead when the relay is operated.

Under idle conditions, that is, with relay CO released battery will be supplied from the PBX station line circuit 12 over the sleeve lead (S) to the lock-up station line unit 18 and will charge capacitor 23 through resistor R1. When line No. 1 is seized, that is, when hunting connector 11 engages sleeve terminal 24, and the other terminals of the line, ground from the hunting connector will be supplied over the sleeve instead of the battery previously supplied. Now, with ground connected to both sides of capacitor 23, the capacitor will discharge through diode D2, break contacts BY–1 of relay BY and A1–1 of relay A1, upper winding of lock-up relay LU to ground. Relay LU operates over this path and locks up from battery, through its lower winding and make contact LU–1, break contact of key LOK, make contact G–1 of relay G, to ground at the common transistor control circuit 22. (Relay G of the transistor control circuit is normally held operated as will be described subsequently.) Relay LU, operated, also partially completes at its LU–2 make contact an operating path for "busy" relay BY.

When, upon completion of the call, station telephone set 13 goes on-hook and is released from the connection, cut-off relay CO will release and battery will be again applied over sleeve lead S. Relay BY will now operate on this battery through its break contact BY–2, resistor R2, winding of relay BY, break contact A1–2 of relay A1, make contact LU–2 of relay LU to ground. Relay BY, upon operating, locks over a path from battery, its make contact BY–3 and winding, break contact A1–2 of relay A1, make contact LU–2 of relay LU to ground. Transfer contacts BY–2 and BY–4 are early break before make contacts thereby preventing operation of the CO relay at this time before relay BY can lock to battery through its contacts BY–3. A path is now completed (that is, upon operation of relay BY) for operation of cut-off relay CO, this path being traced from ground, make contact BY–4 of relay BY, winding of relay CO to battery. Relay CO, operated, applies ground to sleeve lead S which causes the line to test busy to the hunting connector, even though the line is, of course, actually in nonbusy condition.

It will be understood that the other PBX station line circuits of the group and the corresponding lock-up station line units operate in a similar manner to that described in connection with line circuit 12 and lock-up unit 18, and that all the lines of the group are progressively busied until all have been so conditioned. The respective lock-up relays upon operating are locked to a common ground at the transistor control circuit over respective leads, as LG and NLG, all of which terminate in a common lead 27 at the transistor control circuit 22. The ground referred to is reached through a make contact, G–1, of the normally operated G relay. So long as there is an idle line in the group, that is, so long as at least one cut-off relay, as CO, NCO, is in released condition, battery will be supplied over a respective lead, as S1, NS1, to the transistor control circuit 22 where they all terminate in common lead 28. This battery is applied through resistor R4 and diode D5 to the base electrode 41 of transistor Q1 whereby to hold the transistor in conductive condition. Under this condition, relay G is held operated over a path from ground, emitter-collector circuit of the transistor, winding of relay G to battery. So long as a single line of the group remains idle, therefore, ground appears on lead 27 through make contact G–1 of relay G, and locking paths are maintained for all operated lock-up relays (as relay LU).

Let us assume now, however, that all the lines have been busied in which case, of course, all cut-off relays, as CO, NCO, have been operated and locked in that position. Battery no longer appears on common terminating lead 28 whereby to maintain transistor Q1 conductive and relay G operated. Accordingly, relay G releases, the ground is removed from lead 27 at make contact G–1, and the holding paths for all lock-up relays, as relay LU, are interrupted and the relays release. It is desirable, of course, that complete restoration of the circuit to normal and start of the next cycle of operations be delayed until all lock-up relays have fully released and the novel arrangement contemplated by the invention is such that this desirable delaying action is assured. Assuming that one lock-up relay is delayed in its release and assuming further for purposes of description that relay LU is the relay in point, battery will be applied through make contact LU–1 to line 27 and, now that the ground has been removed at make contact G–1 of relay G, this battery will be applied through resistor R5 to base electrode 42 of transistor Q2. This renders transistor Q2 conductive and ground is connected to lead 28 through the collector-emitter path thereof whereby to establish a shunting path with regard to the connection to base 41 of transistor Q1 and to thereby avoid the application of an activating potential thereto. However, when lock-up relay LU (and all other lock-up relays) has fully released, battery will be removed from base electrode 42 of transistor Q2, which will become nonconductive, and the ground will be removed from lead 28. Transistor Q1 will now be rendered conductive, relay G will operate and the locking ground will be applied through make contact G–1 to lead 27 thereby providing locking paths for the lock-up relays as they operate.

It may happen, of course, that while a line is artificially busied it becomes desirable to initiate an outgoing call from the associated station telephone set, for example, telephone set 13. When the telephone set goes off-hook for initiation of the call, ground will be applied at the switchhook contact to line 43 and relay A1 will operate over an obvious path. Relay A1, operated, will interrupt at its A1–2 break contact the holding path for relay BY, which releases. Relay BY, upon releasing, interrupts at its BY–4 make contact the operate path of relay CO which releases and removes the artifical busy indication from the line. Also, relay A1, upon operating, completes at its make contact A1–3 a discharge path through resistor R8 for capacitor 23 and at the same time interrupts at its A1–1 break contact the previous discharge path through the upper winding of relay LU. This action provides for dissipating the discharge from condenser 23 when the line finder closes ground to the sleeve lead and prevents false operation of relay LU in the event relay A1 releases while the line finder ground is still on the sleeve lead. In the event it becomes desirable for all lines to function temporarily without the call distributing feature, key LOK of the transistor control circuit may be operated to open the path to ground and interrupt the holding path for the lock-up relays. In the event a particular station is to be unattended it may be made "busy" to incoming calls by closing SBK key whereby to operate relay BY over a path from ground, SBK key, break contact A1–2 of relay A1, winding of relay BY, resistor R2, break contact BY–2 of relay BY, to battery on the "idle" sleeve.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a private branch exchange, a hunting connector at said private branch exchange, a group of line terminals engageable by said hunting connector, a group of extension stations connected respectively to said line terminals, a first relay and a second relay at each of said stations, a locking path common to all of said first relays effective upon operation of each respective first relay to hold the relay operated, means effective in turn as a respective station is seized by said hunting connector for operating the first relay of that station, means effective in turn as a call is completed by a respective station and the station released for operating the second relay of the respective station, means effective upon operation of each second relay for indicating an artificial busy condition of the associated station, and means effective upon release of the last station of the group after completion of a call for interrupting said locking path and releasing all operated first relays whereby to remove all artificial busy condition indications.

2. In a telephone system, the combinantion defined by claim 1 further characterized in means for preventing re-establishment of said locking path before all of said first relays have released.

3. In a telephone system, a connector means, a group of line terminals engageable by said connector means, a group of stations connected respectively to said line terminals, a lock-up unit associated with each of said stations, a transistor control circuit common to all of said stations, a lock-up relay included in each of said lock-up units, a locking path for each of said lock-up relays, each of said locking paths terminating in a common path in said transistor control circuit, means in said transistor control circuit for connecting ground potential to said common path, means effective in turn as each station is seized by said first-mentioned connector means to operate the lock-up relay of the associated lock-up unit and to complete the respective locking path therefor, means effective in turn as a call is completed by a respective station and the station released for indicating an artificial busy condition of the associated station, and means effective upon release of the last station in the group after completion of a call for inactivating said connecting means in said transistor control circuit and removing the ground potential from said common path whereby to interrupt all of said locking paths and remove all artificial busy condition indications.

4. In a telephone system, the combination defined by claim 3 further characterized in that each of said lock-up units also includes a second relay and in that said artificial busy condition indicating means includes means for operating the second relay of the respective station.

5. In a telephone system, the combination defined by claim 3 further characterized in additional means for preventing the re-establishment of any of said locking paths until all of said lock-up relays are in released condition.

6. In a telephone system, the combination defined by claim 5 further characterized in that said means in the transistor control circuit for connecting ground potential to said common path includes an additional relay and means for holding said additional relay operated so long as a single station of the group indicates an idle condition.

7. In a telephone system, the combination defined by claim 6 further characterized in that said transistor control circuit includes a first and a second transistor and that said relay holding means includes said first transistor and means for connecting the relay operating winding in circuit therewith.

8. In a telephone system, the combination defined by claim 7 further characterized in that said additional means for preventing the re-establishment of any of said locking paths includes said second transistor and means for holding said second transistor in conductive condition until all of said lock-up relays are in released condition.

9. In a telephone system, a private branch exchange, a connector means at said private branch exchange, a group of line terminals engageable by said connector means, a group of extension stations connected respectively to said line terminals, a first relay, a second relay and a third relay at each of said stations, an operating path for each of said first relays, a locking path for each of said first relays effective upon operation of a respective first relay to hold the relay operated, means effective in turn as a respective station is seized by said connector means for operating the said first relay of that station, means effective in turn as a call is completed by a respective station and the station released for operating the said second relay of the respective station, means effective upon operation of each second relay for indicating an artificial busy condition of the associated station, means effective upon initiation of an outgoing call from a respective station to operate the respective third relay associated therewith, and means effective upon operation of said third relay to release said second relay of the station whereby to remove the artificial busy condition indication.

10. In a telephone system, the combination defined by claim 9 further characterized in that said operate path of each of said first relays includes the discharge path of a capacitor.

11. In a telephone system, the combination defined by claim 10, further characterized in that operation of a respective third relay is also effective to provide a shunting path to ground for the respective capacitor discharge path included in the operate path of the associated first relay.

References Cited in the file of this patent

UNITED STATES PATENTS

| | | |
|---|---|---|
| 2,709,718 | Pharis | May 31, 1955 |
| 2,787,741 | Bretschneider | Apr. 2, 1957 |
| 3,027,426 | Eklund | Mar. 27, 1962 |